United States Patent
Jurgens

(10) Patent No.: US 8,617,626 B2
(45) Date of Patent: Dec. 31, 2013

(54) DIETAY SUPPLEMENT COMPOSITION

(75) Inventor: Steve E. Jurgens, Filley, NE (US)

(73) Assignee: Novartis AG, Basel (CH)

( * ) Notice: Subject to any disclaimer, the term of this patent is extended or adjusted under 35 U.S.C. 154(b) by 918 days.

(21) Appl. No.: 11/991,890

(22) PCT Filed: Sep. 14, 2006

(86) PCT No.: PCT/US2006/035888
§ 371 (c)(1),
(2), (4) Date: Aug. 22, 2008

(87) PCT Pub. No.: WO2007/035431
PCT Pub. Date: Mar. 29, 2007

(65) Prior Publication Data
US 2010/0221405 A1    Sep. 2, 2010

Related U.S. Application Data

(60) Provisional application No. 60/717,868, filed on Sep. 16, 2005.

(51) Int. Cl.
*A23L 1/30* (2006.01)
*A23L 1/304* (2006.01)

(52) U.S. Cl.
USPC .................................. 426/74; 426/573

(58) Field of Classification Search
USPC .............................. 426/72, 573, 74
See application file for complete search history.

(56) References Cited

U.S. PATENT DOCUMENTS

| | | | |
|---|---|---|---|
| 5,254,551 A * | 10/1993 | Kirk et al. | 514/251 |
| 5,358,729 A * | 10/1994 | Ohkuma et al. | 426/567 |
| 5,851,578 A | 12/1998 | Gandhi | |
| 6,436,446 B1 * | 8/2002 | Forusz et al. | 424/682 |
| 2003/0185941 A1 | 10/2003 | Highman | |
| 2005/0100636 A1 | 5/2005 | Botteri | |

FOREIGN PATENT DOCUMENTS

| | | |
|---|---|---|
| WO | WO 0028838 | 5/2000 |
| WO | WO 0205667 | 1/2002 |
| WO | WO 2004054369 | 7/2004 |
| WO | WO 2006082501 A2 * | 8/2006 |

OTHER PUBLICATIONS

"Calcium Lactate Gluconate—Innovative sollution for extra calcium", obtained from Innovations in Food technology, Issue 16, Aug. 2002, 3 pages.*

* cited by examiner

*Primary Examiner* — Jyoti Chawla
(74) *Attorney, Agent, or Firm* — Larson & Anderson, LLC

(57) ABSTRACT

The present invention provides a composition containing water-soluble dietary fiber and an organic calcium salt. The composition is freely flowable and dissolves quickly. The composition provides dietary fiber and calcium in a convenient delivery format.

7 Claims, No Drawings

DIETAY SUPPLEMENT COMPOSITION

The present invention relates to a dietary supplement composition. More particularly, the present invention relates to a dietary supplement providing dietary fiber and calcium.

BACKGROUND OF THE INVENTION

Dietary fibers are complex carbohydrate polymers found in plants, which are not digested by the human digestive system, and the fibers are broadly divided into water soluble and water insoluble groups. Dietary fiber passes the upper digestive system unchanged into the large intestine where water-soluble dietary fiber may be digested by naturally occurring bacteria. It is known that the consumption of dietary fiber provides many health benefits. Consuming dietary fiber may help prevent, for example, constipation, diverticulitis, cardiovascular disease, and certain cancer by retaining water, diluting toxins, and hindering cholesterol absorption in the large intestine. Water-soluble dietary fiber is naturally found, for example, in oat bran, legumes, psyllium, nuts, beans, pectins and various fruits and vegetables. Given that typical modern diet may not provide a sufficient amount of dietary fiber, there are nutritional products that are designed to supplement water-soluble dietary fiber. For example, chewable or swallowable tablets, powders, and fiber-fortified drinks and food items are commercially available.

Another highly beneficial dietary supplement is a calcium supplement. Calcium is a key mineral necessary for normal body functions, but the body's ability to absorb calcium is reduced with age, making it difficult for the body to obtain a sufficient amount of calcium from the normal diet and leading to osteoporosis and other health problems. Many forms of calcium supplements are available to ameliorate these problems. For example, calcium tablets, and calcium-fortified drinks and food items are commercially available. In general, high levels of calcium, particularly insoluble forms, such as carbonates and phosphates, tend to produce a chalky mouthfeel and may impart astringency or bitter taste. Calcium carbonate may come across as soapy or lemony and has the disadvantage of developing carbon dioxide gas in the stomach. Calcium phosphate has a bland flavor, but imparts a gritty mouthfeel.

Although supplements for dietary fibers and calcium are separately available, supplements specifically designed to provide nutritionally sufficient levels of dietary fibers and calcium in combination are not widely available. A supplement for providing both dietary fiber and calcium that can be administered or consumed conveniently is highly desirable.

SUMMARY OF THE INVENTION

The present invention provides a pourable composition containing water-soluble dietary fiber and an organic calcium salt. The pourable composition can be added to or sprinkled over an edible or drinkable article to enrich the article to provide supplementary amounts of dietary fiber and calcium. The dietary fiber is selected from water-soluble fibers that is highly soluble and imparts no or sufficiently no viscosity increase to the article. The calcium source is selected from organic calcium salts that have a high water solubility and no or substantially no disagreeable taste. As a preferred embodiment, the pourable composition contains between 40 and 80 weight percent (wt %) of the dietary fiber and between 60 and 20 wt % of the calcium source, based on the total weight of the dietary fiber and the calcium source.

The pourable composition is a highly desirable means for supplementing the fiber and calcium in that the composition can be added to ordinary edible or drinkable products, eliminating the step of a separate administration or consumption of the supplement. The pourable composition can be conveniently added to various edible articles since it incorporates quickly into the edible article without appreciably changing the organolaptic and aesthetic properties of the edible article. The composition quickly dissolves in beverages or liquid food without appreciably altering the taste, increasing the texture or viscosity, or changing the clarity or appearance.

DETAILED DESCRIPTION OF THE INVENTION

The pourable composition of the present invention contains dietary fiber and an organic calcium salt that are water soluble. The composition is highly soluble such that a relatively large amount of the composition can be added to and quickly incorporated into an edible article, especially when the edible article has high moisture content or is a liquid. For example, if the edible article is an aqueous liquid product, the composition quickly dissolves and blends into the contents of the product without imparting appreciable organoleptic property and taste profile changes, e.g., viscosity increase or undesirable taste. Accordingly, the pourable composition can be conveniently used to supplement nutritional values of an edible article without sacrificing its original flavor and organoleptic properties. Additionally, the composition is pourable or freely flowable from a container, making the composition easy to withdraw from a container, for example, by shaking the container or using a spoon. The term pourable as used herein indicates that the composition is a particulate, granule or powder composition which is freely flowable and spoonable.

As one embodiment, the pourable composition contains between 40 wt % and 80 wt %, preferably between 50 wt % and 70 wt %, more preferably 55 wt % and 65 wt %, of a water-soluble dietary fiber, and between 60 wt % and 20 wt %, preferably between 50 wt % and 30 wt %, more preferably 45 wt % and 35 wt %, of an organic calcium salt, based on the total weight of the fiber and the calcium salt. The most preferred pourable composition contains about 60 wt % of a water-soluble fiber and about 40 wt % of an organic calcium salt. As another preferred embodiment, the pourable composition does not contain significant amounts of other ingredients such that the composition can be applied to an edible composition without imparting any significant taste that can alter the original taste of the edible article. However, the pourable composition may contain a processing aid, e.g., processing lubricant or filler, that does not impart an appreciable extraneous taste profile. It is also desirable for the composition to be devoid of any significant amounts of other components that can increase the caloric content of the article. In this embodiment, the composition is free of other caloric components, e.g., sugar, such that the composition supplements calcium and dietary fiber without increasing the caloric value of the edible article.

Dietary fibers suitable for the pourable composition are water-soluble fibers that do not significantly change the viscosity and taste of the edible article, to which the fiber is added. The term water-soluble fiber is used herein in accordance with AACC (American Association of Cereal Chemists) Method 32-07. Suitable dietary fibers, when dissolved in water at room temperature to form a 10 wt % solution, the fiber increases the viscosity less than 50 cp (=0.05 Pa s), preferably less than 25 cp, and more preferably less than 10 cp. Suitable water-soluble fibers include water-soluble inulin, intact or partially hydrolyzed, fructooligosaccharides, galactooligosaccharides, modified indigestible maltodextrine, partially hydrolyzed guar gum, and mixtures thereof. Inulin is the common name for certain carbohydrate molecules in which one glucopyranosyl unit is coupled to several fructose units in varying degrees of polymerization with the lower limit being generally recognized as about 5 fructose units, although the degree of polymerization can be as low as 2. The upper limit for water-soluble inulin is usually considered a degree of polymerization of about 60. Water-soluble inulin (hereinafter referred to inulin) is commercially available for example from Cargill, U.S.A, under the Oliggo-Fiber brand, e.g., F-97 and LC/HT linulin. Modified maltodextrin dietary fiber is available for example from Matsutani Chemical Industries, Japan, and disclosed in U.S. Pat. No. 5,472,732, incorporated by reference. Suitable soluble dextrins prepared from wheat or maize starch are also available from Roquette Freres under the trade name, Nutriose® (e.g., Nutriose® FB 06 and Nutriose® FB 10) and are disclosed in U.S. Pat. No. 6,630,586, incorporated by reference. Said dextrins have a glycosidic bond distribution as follows: approximately 50% of 1,4-linkages, approximately 30% of 1,6-linkages, and approximately 10% each 1, 2- and 1,3-glycosidic linkages. Partially hydrolyzed guar gum dietary fiber is commercially available from Novartis Consumer Health under the trademark BENEFIBER®. The guar gum fiber is produced by partially hydrolyzing guar gum to reduce its average molecular weight to around one tenth of unmodified guar gum. Prior to hydrolysis, the molecular weight of guar gum is approximately 200,000, and after hydrolysis, it is typically 15,000 to 35,000, preferably 20,000 to 30,000. The partially hydrolyzed guar gum fiber does not significantly increase the viscosity of water or other aqueous liquid even when the daily recommended amount of the dietary fiber is dissolved in a readily consumable amount of liquid. Of the suitable water-soluble dietary fibers, particularly suitable is partially hydrolyzed guar gum.

Organic calcium salts suitable for the invention have a water solubility higher than 10 grams per liter (g/l) at room temperature, preferably higher than 30 g/l, more preferably higher than 60 g/l, and most preferably higher than 300 g/l. Additionally, a suitable organic calcium salt does not impart significant taste properties, e.g., disagreeable taste, to the edible article. Suitable organic calcium salts include calcium gluconate, calcium lactate, and calcium lactogluconate. Calcium lactogluconate, which is also known as calcium lactate gluconate, is particularly preferred for its high solubility and neutral taste profile. Although calcium lactogluconate is a mixture of calcium lactate and calcium gluconate, calcium lactogluconate is about five to ten times more soluble than calcium lactate and calcium gluconate, respectively. In addition, calcium lactogluconate is more taste neutral than calcium lactate or calcium gluconate. At high concentrations, for example, calcium lactate may impart bitter taste. Preferred calcium lactogluconate has an elemental calcium content between 11% and 13%. Calcium lactogluconate is commercially available, for example, from Jungbunzlauer or Purac.

The present composition can be prepared by mixing a powder form of a dietary fiber and a powder form of an organic calcium salt. A wet agglomeration process can also be used to produce low density granules of the composition to ensure that the contents of the composition are uniformly intermixed and to provide a delivery form that has increased wetting properties. In general, a wet agglomeration process forms agglomerates by wetting a powder material with a binding agent, e.g., water, while fluid mixing the powder to cause the powder to form wetted and subsequently agglomerated granules. The resulting agglomerates may be screened and/or milled to yield a specific desired particle size. It is to be noted that the agglomerates should not be too large as to hinder its solubility, or too fine as to be to easily dispersed in the air or lack sufficient liquid dispersion properties. It is advantageous for the pourable form of the composition to have sufficient void volume in relation to the weight of the composition to promote quick wetting and subsequent dissolution in an aqueous consumable article, such as beverage or liquid food article. Preferred agglomerates have an average particle size between 100 and 500 micrometers, and preferred agglomerates have a density between 0.25 and 0.41 gram/cubic centimeter, more preferably between 0.29 and 0.33 gram/cubic centimeter, preferably between 0.25 and 0.37 gram/cubic centimeter.

The present composition can be added to various food or beverage products. It can be added to edible products that are clear or transparent since the composition dissolves to clearly and colorlessly incorporate into the edible products. The composition can also be mixed with cooking ingredients, or sprinkled on fully prepared edible articles.

In addition to the dietary fiber and organic calcium, the composition may additionally contain other ingredients. Ingredients that facilitate manufacturing processes, improve aesthetics and organoleptic properties of the composition can be added. These ingredients include stabilizer, colorants, fillers and processing aids, depending on the intended use of the composition. Depending on the application of the composition, other materials can also be added including flavorants, natural sweeteners, and artificial sweetener. However, natural sweeteners should be avoided if a low caloric supplement is desired. Suitable flavoring agents may be selected from synthetic flavor oils and/or those derived from natural fruits, plants, leaves, flowers, and so forth, and combinations thereof such as citrus oil including lemon, orange, grape, lime and grapefruit and fruit essences including apple, apricot, strawberry, cherry, pineapple and the like. Also useful are flavor oils such as spearmint oil, cinnamon oil, oil of wintergreen (methylsalicylate) and peppermint oils.

The present invention is further illustrated by reference to the following example. The example is intended to illustrate desired embodiments and is not intended to limit the scope of the invention.

Example 1

Dry blend 230 kg of partially hydrogenated guar gum fiber (PHGG), which is available from Novartis Consumer Health under the trademark Benefiber®, and 150 kg of calcium lactogluconate (CLG), PURACAL® XPro, available from Purac Biochem, Netherlands. Fluidize the PHGG and CLG in a Glatt 500, and proceed to agglomerate the mixture by introducing a fine spray of purified water over a 30-60 minute period using a sufficient combination of fluidization airflow and incoming air temperature to maintain a semi-moist environment to accomplish particulate agglomeration without excessive particle wetting so as to prevent particle collapse. The process is considered complete when robust agglomerates are produced with acceptable dissolution characteristics with an average particle size between approximately 100-500 micrometers and with minimal fine and coarse particles which do not contain sufficient void volume, and therefore are not easily dispersed. The larger agglomerates are removed by screening through a 20 mesh screen and ground to reduce the particle size. The collected agglomerates are dried to a moisture content of less than 4 weight %. The dried agglomerate is highly soluble in aqueous media and do not impart significant changes in viscosity or taste to the media.

Example 2

Nutriose® FB 06, a soluble dextrin having a weight average molecular weight of about 5000 and a number average molecular weight of about 2800 g/mole, and a residual content in Dp1 (monosaccharides) and Dp2 (disaccharides) of below 0.5%/DS, is dry blended with calcium lactogluconate and agglomerated according to the procedure of Example 1, to form a dried agglomerate that is soluble in aqueous media.

What is claimed is:

1. A pourable-solid composition comprising between 40 and 80 weight percent of a soluble dextrin prepared from wheat or maize starch and between 20 and 60 weight percent of calcium lactogluconate having a calcium content of higher than 10 weight %, wherein said calcium lactogluconate has a solubility higher than 10 gram/liter in water at room temperature, and wherein said pourable solid composition is a powder formulated for addition to edible or drinkable food articles without appreciably altering the taste, texture, viscosity or appearance of such items.

2. The composition of claim 1, wherein said composition is an agglomerate particle composition.

3. The composition of claim 1 wherein said composition comprises 60 weight percent of the dextrin prepared from wheat or maize starch and 40 weight percent of calcium lactogluconate.

4. The pourable solid composition of claim 1 wherein the soluble dextrin has the property of providing a viscosity increase when dissolved in water to produce a 10 w/v % water solution at room temperature of increasing viscosity of the water by less then 50 cp.

5. A composition consisting essentially of between 40 and 80 weight percent of a dextrin prepared from wheat or maize starch and between 20 and 60 weight percent of calcium lactogluconate having a calcium content of higher than 10 weight %, based on the total weight of said fiber and calcium lactogluconate wherein said composition is a powder composition that increases viscosity less than 50 cp when 10 w/v % of a water solution at room temperature is formed, and wherein the powder composition is formulated for addition to edible or drinkable food articles without appreciably altering the taste, texture, viscosity or appearance of such items.

6. The composition of claim 5 wherein said composition is granules having an average particle size between 100 and 500 micrometers.

7. The composition of claim 5 wherein the powder is an agglomerate composition having a density between 0.25 and 0.41 gram/cubic centimeter.

* * * * *

UNITED STATES PATENT AND TRADEMARK OFFICE
CERTIFICATE OF CORRECTION

| | | |
|---|---|---|
| PATENT NO. | : 8,617,626 B2 | Page 1 of 1 |
| APPLICATION NO. | : 11/991890 | |
| DATED | : December 31, 2013 | |
| INVENTOR(S) | : Steve Jurgens | |

It is certified that error appears in the above-identified patent and that said Letters Patent is hereby corrected as shown below:

On the Title page, item (54) and in the Specification, Column 1, line 1,

The title should be: DIETARY SUPPLEMENT COMPOSITION

Signed and Sealed this
First Day of April, 2014

Michelle K. Lee
*Deputy Director of the United States Patent and Trademark Office*